No. 832,027.
PATENTED OCT. 2, 1906.
I. ALBERTELLI.
BANANA CRATE.
APPLICATION FILED NOV. 28, 1904.
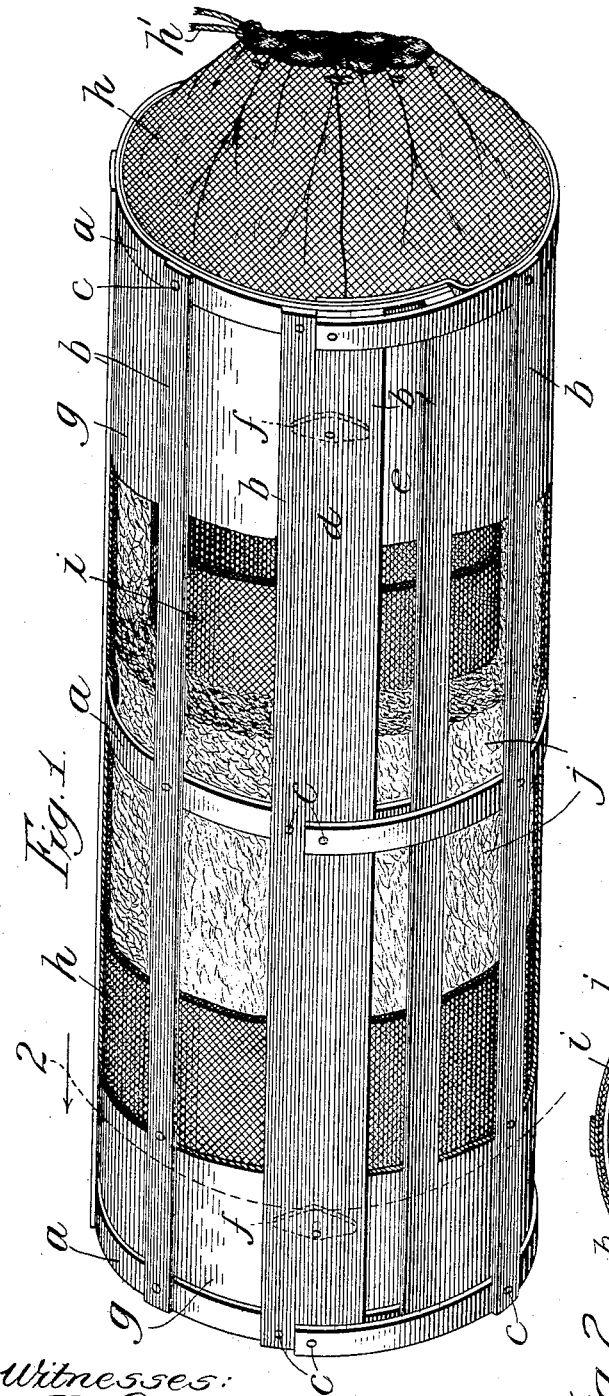
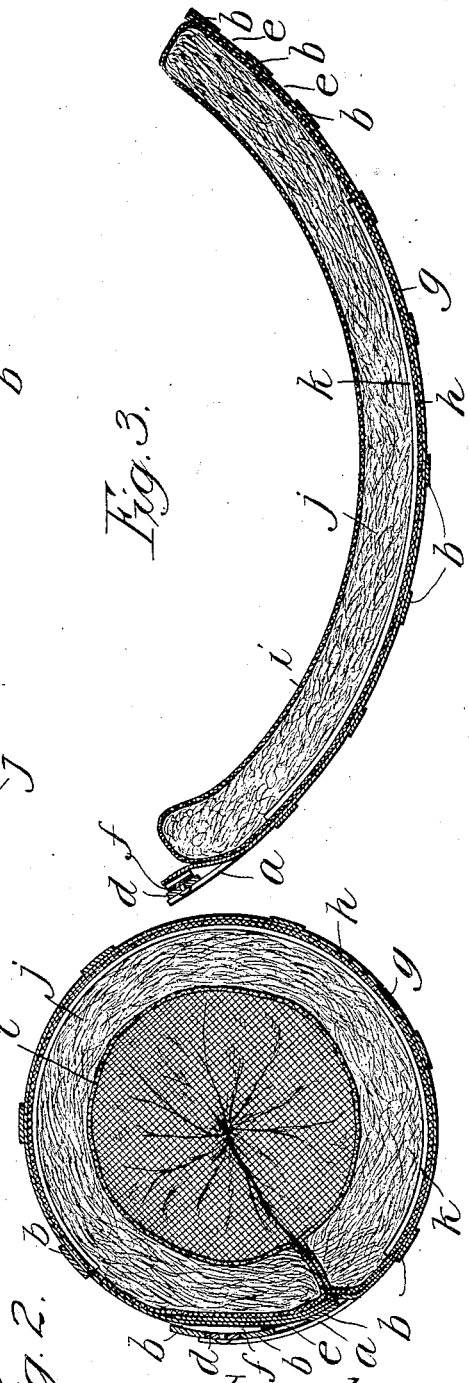
Witnesses:
Chas. E. Gaylord.
John Enders
Inventor:
Innocent Albertelli,
By Thomas F. Sheridan,
Att'y
THE NORRIS PETERS CO., WASHINGTON, D. C.

UNITED STATES PATENT OFFICE.

INNOCENT ALBERTELLI, OF CHICAGO, ILLINOIS.

BANANA-CRATE.

No. 832,027.

Specification of Letters Patent.

Patented Oct. 2, 1906.

Application filed November 28, 1904. Serial No. 234,524.

*To all whom it may concern:*

Be it known that I, INNOCENT ALBERTELLI, a citizen of the United States, residing in the city of Chicago, county of Cook, and State of Illinois, am the inventor of certain new and useful Improvements in Banana-Crates, of which the following is the specification.

My invention relates to that class of crates comprising a flexible framework or casing adapted to contain a bunch of bananas or the like and form a protecting-covering therefor.

It relates particularly to crates having a flexible casing or framework adapted to be adjusted to different sizes to correspond with the quantity of bananas or other articles to be contained therein and adapted to be secured in any adjusted position and to be opened and closed when desired for the purposes of shipment or for the purpose of packing or unpacking.

The principal object of my invention is to provide a simple, economical, and efficient banana-crate.

A further object of the invention is to provide a banana-crate having a flexible outer framework or shell portion, the side edges of which are adapted to be adjusted with relation to each other and to be secured in adjusted position, so as to form a package of the desired size and permit the crate to be opened or closed when desired for the purposes of packing or unpacking or for the purpose of enabling a number of empty crates to be nested and packed snugly together to facilitate the handling or shipment thereof.

Further objects of the invention are to provide a crate comprising a flexible framework adapted to be opened or closed and secured in closed position in such a manner as to dispense with the use of hinges; to provide a suitable cushion for such outer framework adapted to protect the fruit from being bruised and from being injured by atmospheric conditions or otherwise; to permit the fruit to be readily packed and unpacked; to permit the adjustment of the cushioned crate into snug contact with the fruit, so as to prevent so far as possible the shifting of the fruit in the package, and to provide a crate of sufficient rigidity to resist the strains to which it is subjected in use.

Other and further objects of the invention will appear from an examination of the drawings and the following description and claims.

The invention consists in the features, combinations, and details of construction hereinafter described and claimed.

In the accompanying drawings, Figure 1 is a perspective view in elevation of a crate constructed in accordance with my improvements, having portions of the different layers of the protecting-cover and cushion portions removed for the purpose of illustrating their position with relation to each other and the manner of their arrangement to form the complete package; Fig. 2, a sectional elevation taken on line 2 of Fig. 1 looking in the direction of the arrow and showing the inner cleat for holding the cushion in place with respect to the outer open framework or crate portion, and Fig. 3 a cross-sectional view showing the crate in open position.

In constructing a crate or wrapper in accordance with my improvements I provide an outer framework formed of a plurality of flexible hoops $a$, made, preferably, of thin wooden strips sufficiently flexible to permit the framework to be adjusted to any desired size and sufficiently resilient to resist the strains to which the crate is subjected in use and prevent the collapsing thereof and the consequent injury to the contents in shipping. These flexible hoops are connected by a multiplicity of slats $b$, extending at right angles and secured thereto by means of nails or rivets $c$. These slats are sufficiently rigid to afford the desired rigidity and strength to the framework and are arranged at sufficient distances apart to permit ventilation when the crate is used in warm weather and to render it as light as possible in view of the purposes for which it is used. The slats $b$ may be mounted upon the outside of the hoops, but one side edge of the framework is provided with a locking-slat $d$, mounted upon the inner side of the hoops and preferably at or near the extreme ends thereof, adapted to enter the desired space $e$ between the slats $b$ and to be held in position in such space and between the opposite end portions of the hoops.

In Fig. 1 the locking-slat $b$ is secured in the space next adjacent to the first space from the side edge over which it is folded. It thus forms a package somewhat smaller than would be formed in case of securing it in position in the first space between the slats. In order to make the package larger, it is therefore necessary only to adjust the locking-slat $b$ in place in a space nearer the edge over which it is folded. It may be made smaller still by adjusting the locking-slat in position in the desired space still farther from the side edge over which it is folded. Latches or buttons $f$ are provided, preferably upon the inner side of the locking-slat, adapted to be turned into engagement with the inner side of the next adjacent slat or slats $b$, so as to secure the side edges of the framework or crate together in any desired position to which it may be adjusted.

In order to form an efficient cushion and protecting-covering for the contents of the crate, adapted to protect the fruit from frost and from all harmful atmospheric conditions, a layer $g$ of thick paper, such as building-paper, is mounted upon the inside of the outer framework or crate proper, so as to inclose the contents thereof. A cushion is then provided, formed of an outer layer $h$ of burlap or similar fabric, an inner layer $i$ of the same, made preferably integral with such outer layer, and providing a space therebetween for receiving a filler, and a filler $j$, of compressible material, arranged in such space. Hay or straw may be used for a filler, and the whole forms a protecting-cushion adapted to be compressed and adjusted, so as to permit the adjustment of the crate to different sizes and protect the fruit from being injured by bruising or otherwise. This cushion is held in place upon the inner side of the open framework or outer crate portion by means of flexible securing-cleats $k$, extending in a direction substantially parallel with the flexible hoops and of less length than the hoops, also of less length than the width of the cushion from one side edge thereof to the other, such side edges or margins of the cushion being thus left detached from the frame or loose, so as to leave such opposite sides of the cushion free to fold one over the other and adapted to be compressed and adjusted as required in the proper adjustment of the crate to its different positions. Each end of the fabric $g$ is left open and is made of sufficient length in excess of the length of the crate to permit the fabric to close the ends of the crate when in operative position. Both ends of the fabric are provided with puckering-strings $h'$, by means of which they may be secured in closed position and readily opened when desired.

By the above arrangement of elements it will be readily seen that a flexible crate is provided, having a flexible and compressible cushion portion secured to the outer open framework portion thereof in such a manner as to permit the opposite side edges of the crate to be adjusted with relation to each other and folded or telescoped so as to form a package of any desired size, while at the same time dispensing with the use of hinges for enabling the crate to be opened or closed for purposes of packing, unpacking, or shipment. It will also be noted that while the hoops of the crate are sufficiently flexible to permit the adjustment to different sizes and folding to form a substantially cylindrical crate they are resilient to such an extent as to resist the strains to which the crate is subjected in use, which would otherwise cause it to collapse.

I claim—

1. In a crate of the class described the combination of a multiplicity of slats a plurality of which are provided with spaces therebetween, flexible hoops mounted upon the inner side thereof and flexibly connecting all of such slats and a slat mounted on the inner side of such hoops and arranged to be placed in position between different pairs of slats on the outside of the hoops, substantially as described.

2. In a crate of the class described the combination of a plurality of flexible hoops, a plurality of slats provided with spaces therebetween and mounted upon one side of and flexibly connected together by means of such hoops, and a slat mounted upon the other side of such hoops and adapted to enter either of a plurality of such spaces, and means for securing the crate in closed position, substantially as described.

3. In a crate of the class described the combination of a flexible outer casing adapted to be rolled into substantially circular form, and having side edges adjustable to different closed positions for changing the size of the crate, a flexible cushion mounted upon the inner side thereof formed of compressible material and having a marginal portion detached from the outer casing and adapted to admit the opposite edge of the casing between the cushion and adjacent outer casing portion, and means for flexibly securing such cushion in position, substantially as described.

4. In a crate of the class described the combination of a flexible outer casing adapted to be rolled into substantially circular form, a flexible cushion mounted upon the inner side thereof, and flexible cleats mounted in the cushion and secured to the outer casing for supporting the cushion in place, substantially as described.

5. In a crate of the class described the combination of a plurality of slats a plurality of flexible hoops connected to and flexibly connecting all of such slats and forming an outer casing or framework, a cushion comprising a compressible material having a covering of fabric mounted upon the inside of the crate, and means for securing the ends of such fabric together to close the ends of the crate, substantially as described.

INNOCENT ALBERTELLI.

Witnesses:
 THOMAS F. SULLIVAN,
 ANNIE C. COURTENAY.